United States Patent [19]

Akiyama et al.

[11] Patent Number: 5,646,802

[45] Date of Patent: Jul. 8, 1997

[54] DISK DRIVE WITH HEAD SUSPENSIONS MOUNTED TO ACTUATOR ARM OPPOSITE SIDES TO FACE RESPECTIVE UPPER AND LOWER SURFACES OF DISK

[75] Inventors: Hiroyuki Akiyama, Kawasaki; Akihiko Aoyagi; Kazuhiko Takada, both of Yamato; Hitoshi Tsujino, Tokyo-to, all of Japan

[73] Assignee: International Business Machines Corporation, Armonk, N.Y.

[21] Appl. No.: 421,112

[22] Filed: May 22, 1995

Related U.S. Application Data

[62] Division of Ser. No. 393,598, Feb. 23, 1995, Pat. No. 5,508,860, which is a continuation of Ser. No. 215,876, Mar. 21, 1994, abandoned, which is a continuation of Ser. No. 802,385, Dec. 4, 1991, abandoned.

[30] Foreign Application Priority Data

| Sep. 12, 1991 | [JP] | Japan | 3-260498 |
| Sep. 12, 1991 | [JP] | Japan | 3-260499 |
| Sep. 12, 1991 | [JP] | Japan | 3-260500 |
| Sep. 12, 1991 | [JP] | Japan | 3-260501 |

[51] Int. Cl.$^6$ ............... G11B 21/16; G11B 25/04; G11B 21/08

[52] U.S. Cl. ............... 360/104; 360/98.01; 360/106

[58] Field of Search ............... 360/97.01, 104, 360/105, 106, 98.01; 369/244

[56] References Cited

U.S. PATENT DOCUMENTS

| 4,829,395 | 5/1989 | Coon et al. | 360/104 |
| 4,937,693 | 6/1990 | Connolly et al. | 360/104 |
| 4,947,275 | 8/1990 | Hinlein | 360/104 |
| 5,012,367 | 4/1991 | Toensing | 360/104 |
| 5,172,286 | 12/1992 | Jurgenson | 360/104 |
| 5,187,626 | 2/1993 | Hopkins et al. | 360/104 |
| 5,189,574 | 2/1993 | Imamura et al. | 360/106 |
| 5,315,467 | 5/1994 | Yoshida | 360/106 |

FOREIGN PATENT DOCUMENTS

| 52-030413 | 3/1977 | Japan | 360/104 |
| 59-121761 | 8/1984 | Japan . | |
| 59-218666 | 12/1984 | Japan . | |
| 59-221872 | 12/1984 | Japan | 360/104 |
| 62-185287 | 8/1987 | Japan | 360/104 |
| 62-256262 | 11/1987 | Japan | 360/104 |
| 62-298012 | 12/1987 | Japan . | |
| 3-168985 | 7/1991 | Japan | 360/104 |

*Primary Examiner*—Craig A. Renner
*Attorney, Agent, or Firm*—Karuna Ojanen; Matthew J. Bussan

[57] ABSTRACT

A reduced height disk drive includes a suspension-actuator assembly in which a head suspension (10) is attached to an actuator (9) on the same side of the head suspension as a transducer head (8) is attached to the head suspension for writing and reading information on and from a disk (7). A spin motor cable (17) is located on the outside of a housing (2) and connected to pins (14) extending from the housing through pins (18) extending from the housing and lines (16) contained in the housing. A printed circuit board (3) having a through hole (3e) in which a connector (13) is provided connects to pins (14) extending from the housing. A flexible printed circuit inside the housing has a connector (11k) for connecting to the pins (14) and (18) at one end and a fixing member for mechanically attaching to the pins at the other end. The flexible printed circuit is attached to the pins in a folded condition.

2 Claims, 13 Drawing Sheets ical connection between the various components contained within the housing and the printed circuit board having circuitry for controlling the components contained in the housing. A spin motor cable is contained within the housing and extended on an inner surface of the base plate to connect a spin motor mounted on the top surface of the base plate to the pins on the base plate. A head suspension is attached to a rotary actuator contained within the housing on a surface of the suspension facing away from the disk surface over which a transducer head attached to the head suspension flies as the disk rotates. A flexible circuit of flat sheet on which circuitry is provided is contained in the housing and extended on the inner surface of the base plate.

DISK DRIVE WITH HEAD SUSPENSIONS MOUNTED TO ACTUATOR ARM OPPOSITE SIDES TO FACE RESPECTIVE UPPER AND LOWER SURFACES OF DISK

This is a divisional of application Ser. No. 08/393,598 filed on Feb. 23, 1995, now U.S. Pat. No. 5,508,860, issued Apr. 16, 1996, which is a continuation of Ser. No. 08/215,876 filed Mar. 21, 1994, now abandoned, which is a continuation of Ser. No. 07/802,385 filed Dec. 4, 1991, now abandoned.

FIELD OF THE INVENTION

The present invention relates to a disk drive apparatus including one or more hard disks for primary use with computer systems.

BACKGROUND ART

The advent of portable computer systems has placed a premium on providing disk drives of even more reduced size and weight. Disk drive apparatus with a disk of approximately 65 mm (2.56 inches) diameter having an overall height of less than 25.4 mm (1.00 inch) and an overall footprint of approximately 100 mm (4.00 inches) in length by approximately 70 mm (2.80 inches) in width now appear in the market. Exemplary of such a disk drive is U.S. Pat. No. 5,025,336 which issued on Jun. 18, 1991 to Morehouse et al for a "Disk Drive Apparatus". The invention of Morehouse et al includes a low profile spin motor using high energy magnets preferably made of a material including a rare earth, a rotary actuator having a voice coil assembly of reduced height achieved by using a housing as a flux return path for magnetic fields produced by the voice coil assembly, and a base plate of the housing having three-level shape where each level is determined by one or more of components contained within the housing to produce room for electronic components mounted on a surface of a printed circuit board facing the base plate. The printed circuit board having circuitry for controlling various components of the disk drive and the housing including a disk are attached to one another in a stacked relationship that results in a height of approximately 16 mm (0.630 inches) including the printed circuit board. In the disk drive apparatus of Morehouse et al, the rotary actuator contained in the housing has head suspensions attached to an actuator arm on a surface of the head suspension facing away from the disk over which a transducer head attached to the head suspension flies as the disk rotates. Electric connection between the housing and the printed circuit board is accomplished by flexible cables extending through gaps between a lid and the base plate of the housing. The flexible cables are connected to a connector mounted on the surface of the printed circuit board facing the housing. A flexible circuit of flat sheet on which circuitry for the components within the housing are mounted is extended on an inner surface of the base plate of the housing and attached to the base plate.

Also known is the disk drive disclosed in International Application WO 91/02349 which was published on Feb. 21, 1991, and is entitled "Architecture For 2½ Inch Diameter Single Disk Drive". Disclosed is a disk drive that has a disk of approximately 65 mm (2.56 inches) diameter, an overall height of approximately 17.3 mm (0.68 inches), and an overall foot print of approximately 100 mm in length by approximately 70 mm in width. The housing of the disk drive includes a base plate that provides pins plugged directly into a connector on a printed circuit board for Of importance in achieving a reduced height dimension is the height of the components contained within the disk drive housing and, especially, the height of a suspension-actuator assembly. In the prior art suspension-actuator assembly, a head suspension is attached to an actuator arm on one surface of the head suspension facing away from a surface of a disk over which a transducer head attached to the suspension flies as the disk rotates. Accordingly, the highest and lowest movable components in the housing of a disk drive apparatus are the actuator arms to which the head suspensions are attached.

Also of importance in attaining a low profile disk drive is the height profile of components which are mounted on the printed circuit board for establishing circuitry, particularly, a connector for providing an interface between the components contained within the housing and the circuitry established on the printed circuit board. In the prior art disk drives, the connector is mounted on a surface of the printed circuit board facing the housing. Then, the housing and the printed circuit board have to be spaced so as to accommodate the connector. Otherwise, the base plate of the housing facing the printed circuit board has to be recessed so as to accommodate the connector.

Of related interest in producing a disk drive of reduced size is the flexible printed circuit contained within the housing to mount electronic modules thereon for signals to and from the heads and other components within the housing. In the prior art disk drives, the flexible printed circuit of flat sheet is extended on the base plate and attached to the base plate by a screw. The housing of a disk drive is getting smaller and smaller. It becomes difficult to find out room for the flexible printed circuit in the housing where the circuit is free from interference with the rotating disks or the rotating actuator arms.

Another important aspect associated with disk drives of reduced height is a spin cable for electrically connecting a spin motor mounted on a base plate of the housing to the printed circuit board. The spin cable in the disk drive disclosed in WO 91/02349 is positioned on an inner surface of the base plate and connected to the pins extending into the housing from the base plate. The spin cable has to be located on the base plate where the cable does not interfere with the rotating disk and the rotating actuator arm. The housing, however, is getting smaller and smaller. Accordingly, it becomes difficult to find room for the spin cable in the housing of the disk drive. Moreover, adhesive used to attach the spin cable to the inner surface of the base plate of the housing is liable to contaminate or erode the disk. The spin cable in the disk drive disclosed in the patent to Morehouse et al extends through gaps between the lid and the base plate of the housing to the connector mounted on the printed circuit board. But, the gaps are liable to introduce contaminant into the housing.

U.S. Pat. No. 4,933,785 discloses a suspension-actuator assembly in which the head suspension is attached to an actuator arm on a surface of the head suspension facing away from a disk surface over which a head transducer flies as the disk rotates.

U.S. Pat. No. 4,965,684 discloses a spin cable provided on an inner surface of a base plate of a housing of a disk drive.

U.S. Pat. No. 5,025,335 discloses a suspension-actuator assembly in which a head suspension is attached to an actuator arm on a surface of the head suspension facing away from a disk over which a transducer head attached to the head suspension flies as the disk rotates.

Japanese published unexamined patent application No. 60-57584 discloses a suspension-actuator assembly in which a pair of head suspensions are attached to an actuator arm on both upper and lower surfaces of the arm and are offset each other. The suspensions are attached to the actuator arm on the surface of the suspension facing away from a disk over which transducer heads attached to the suspension fly as the disks rotate.

Japanese published unexamined patent application No. 2-294977 discloses a suspension-actuator assembly in which a pair of head suspensions are attached to an actuator arm on the surface of the suspension facing away from a disk over which transducer heads attached to the suspensions fly as the disks rotate.

Japanese published unexamined utility model registration application No. 2-129766 discloses a printed circuit board having a through hole in which an electronic module is provided.

SUMMARY OF THE INVENTION

The present invention provides a disk drive apparatus that is especially suitable for use with computer systems where size is of paramount concern. Therefore, an object of the present invention is to provide a low profile or low height disk drive apparatus. The preferred embodiment of the disk drive apparatus includes one or more hard disks of approximately 65 mm diameter that provides 40 or more megabytes of information storage per disk. The disk drive apparatus further includes a spin motor for rotating the hard disk, one or more transducer heads for communicating information with the hard disk, an actuator for moving the transducer heads relative to the hard disk, and a head suspension for connecting the transducer head to an actuator arm of the actuator. The aforementioned components are contained within a housing that provides, among other things, a protected environment in which the aforementioned components operate. Also included in the disk drive apparatus is a printed circuit board on which electronic circuitry for controlling one or more of the components contained within the housing is established. The printed circuit board is attached to the housing in a stacked relationship.

The present invention provides a low profile or low height disk drive apparatus. The height of the disk drive apparatus is, at least in part, determined by the height of the housing. The height of the housing, in turn, is determined by the heights of components, such as, a suspension-actuator assembly, contained within the housing. The present invention provides an improved suspension-actuator assembly having a height less than the presently known suspension-actuator assembly. The low profile suspension-actuator assembly of the present invention is realized by using a head suspension having means for attaching to an actuator arm on the same side of the suspension as a transducer head is attached to the head suspension. In accordance with the present invention, the highest and the lowest movable components contained within the housing are the uppermost and lowermost head suspensions which are typically made of stainless steel. However, in the presently known suspension-actuator assembly in which a head suspension has means for attaching to an actuator arm on a surface of the suspension opposite to the present invention, the highest and the lowest movable components in the housing are the uppermost and the lowermost actuator arms which are typically made of aluminum. Because stainless steel is much stronger than aluminum of the same thickness, the head suspension made of stainless steel can be made much thinner than the actuator arm made of aluminum. Accordingly, the overall height of the housing of the present invention can be reduced in comparison with the presently known disk drive apparatus.

Another factor affecting the height of the disk drive apparatus is the height of a connector located on a printed circuit board for providing an interface between the components within the housing and the circuitry established on the printed circuit board by plugging pins of the housing directly into the connector. Most of the electronic components established on the printed circuit board are located on the side of the printed circuit board facing away from the housing so as to avoid protrusions on the side of the housing facing the printed circuit board due to the various heights of the components contained within the housing. The connector, however, has to be located on the side of the printed circuit board facing the housing so that the pins of the housing are plugged into the connector. Consequently, the housing must be spaced from the printed circuit board by a distance greater than the height of the connector. The present invention avoids this problem by forming a through hole in a printed circuit board and providing a connector in the through hole. Use of the through hole to accommodate the connector results in a disk drive apparatus of which overall height can be reduced by the thickness of the printed circuit board.

Also provided by the present invention is a spin cable provided on the outside of the housing for electrically connecting the spin motor to the printed circuit board. Providing a spin cable outside the housing not only results in a low profile housing of a disk drive apparatus by avoiding interference with rotating disks or rotating actuator arms in a low profile housing but also prevents the disks from erosion or contamination by adhesive used to attach the spin cable to the base plate of the housing. Electric connection between the spin motor and the printed circuit board is accomplished by pins of the housing and the connector of the printed circuit board which are provided for an interface between the components in the housing and the circuitry on the printed circuit board. Therefore, the connector is only one interface between the components in the housing and the circuitry established on the printed circuit board. This only one interface facilitates assembling of the disk drive housing and the printed circuit board.

The present invention also provides an improved flexible printed circuit contained in the housing for establishing circuitry for signals to and from the transducer heads and other components in the housing. The flexible printed circuit of the present invention has, at one end, a connector into which the pins of the housing are plugged and, at the other end, means for attaching to the pins. The flexible printed circuit of the present invention is attached to the housing in a folded manner, in contrast to the known flexible printed circuit which is attached to the housing in an extended manner. The flexible printed circuit of the present invention saves space for attaching the flexible printed circuit in the housing.

Additional advantages of the present invention will be readily seen from the following discussion, particularly when taken in conjunction with accompanying drawings.

BEST MODE FOR CARRYING OUT OF THE INVENTION

The present invention provides a disk drive apparatus having dimensional characteristics that make it particularly useful in portable computer systems or computer systems where space or volume is a primary concern. Of particular importance is the height dimension of the disk drive apparatus which is achieved by reducing the heights of components contained in a housing of a disk drive apparatus. The present invention provides an improved suspension-actuator assembly contained in the housing. The height of the assembly is reduced by attaching a head suspension to an actuator arm at the same side of the head suspension as a transducer head is attached to the head suspension to write and read information on and from a disk. Also provided is an improved spin cable located on the outside of the housing so as to not only prevent the spin cable from interfering with rotating disks or the actuator arms contained in the housing but also prevent adhesive attaching the cable to the housing from contaminating or eroding the disks. The housing is attached to a printed circuit board having circuitry for controlling various components contained within the housing in a stacked relationship. To attain a low profile disk drive, the present invention also provides an improved printed circuit board having a through hole to provide a connector therein. The connector establishes a communication link between the circuitry on the printed circuit board and the components contained within the housing by plugging pins extending from the housing directly into the connector. The spin cable provided outside the housing by the present invention is connected to the pins in the housing so that the connection between the pins and the connector concurrently provides the connection between the spin motor and the printed circuit board. Moreover, the present invention provides an improved flexible printed circuit in the housing. The flexible printed circuit is connected to the pins in the housing for establishing circuitry for signals and power to and from the various components in the housing. The flexible printed circuit of the present invention has a connector to the pins at one end and means for attaching to the pins at the other end. The flexible printed circuit is attached to the pins in a folded condition. The flexible printed circuit is not only able to attach to the housing without any screw but also able to save space occupied by the flexible printed circuit in the housing.

Figure 1:
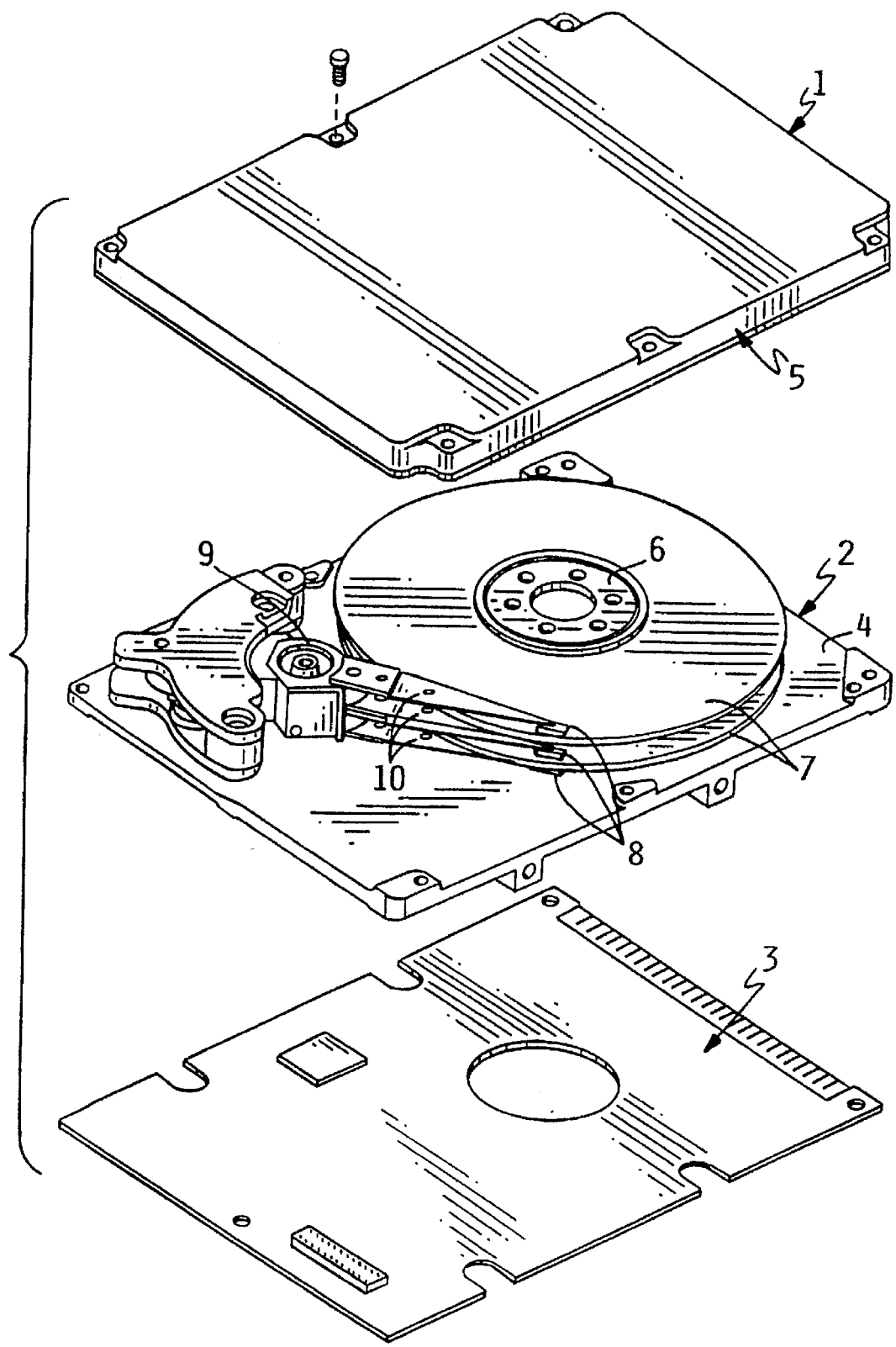
FIG. 1 is an exploded perspective view of a disk drive apparatus in accordance with a first preferred embodiment of the present invention.

With reference to FIG. 1, a first preferred embodiment of the disk drive apparatus 1, hereinafter referred to as disk drive 1, is illustrated. The disk drive 1 includes a housing 2 for containing two hard disks 7 of approximately 65 mm (approximately 2.5 inches) in diameter, a spin motor 6 for rotating the hard disks 7, two pairs of transducer heads 8 for communicating with the upper and lower surfaces of each hard disk 7, four head suspensions 10 for mounting each transducer head 8 thereon at one end, and a rotary actuator 9 to which the head suspensions 10 are attached at the other end of the head suspensions 10 for moving the transducer heads 9 relative to the hard disks 7. The housing 2 includes a base plate 4 of aluminum for providing mounting surface for several aforementioned components and a cover 5 of aluminum to provide a controlled environment where the components contained within the housing 2 operate. As seen from FIG. 1, the highest and lowest movable components contained in the housing 2 are the uppermost and lowermost head suspensions 10. The housing 2 is attached to a printed circuit board 3 establishing circuitry thereon for controlling the components of the drive 1 in a stacked relationship. The length and width dimensions of the printed circuit board 3 are substantially the same as those of the housing 2 which are approximately 100 mm in length by and approximately 70 mm in width. Preferably, the hard disks 7 are magnetic disks capable of storing 40 megabytes or even more, of information per disk.

Figure 2:
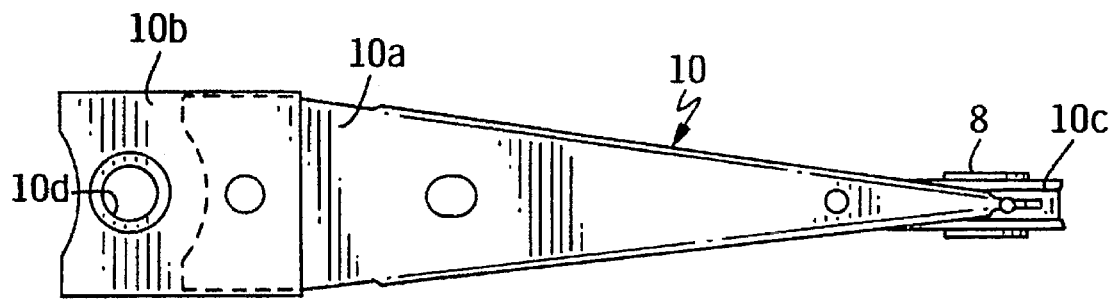
FIG. 2 is a top view of a head suspension in accordance with the first embodiment.
Figure 3:
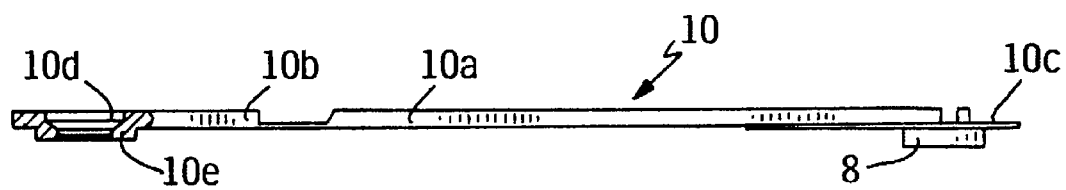
FIG. 3 is a side and partially cross-sectional view of the head suspension of the first embodiment.
Figure 4:
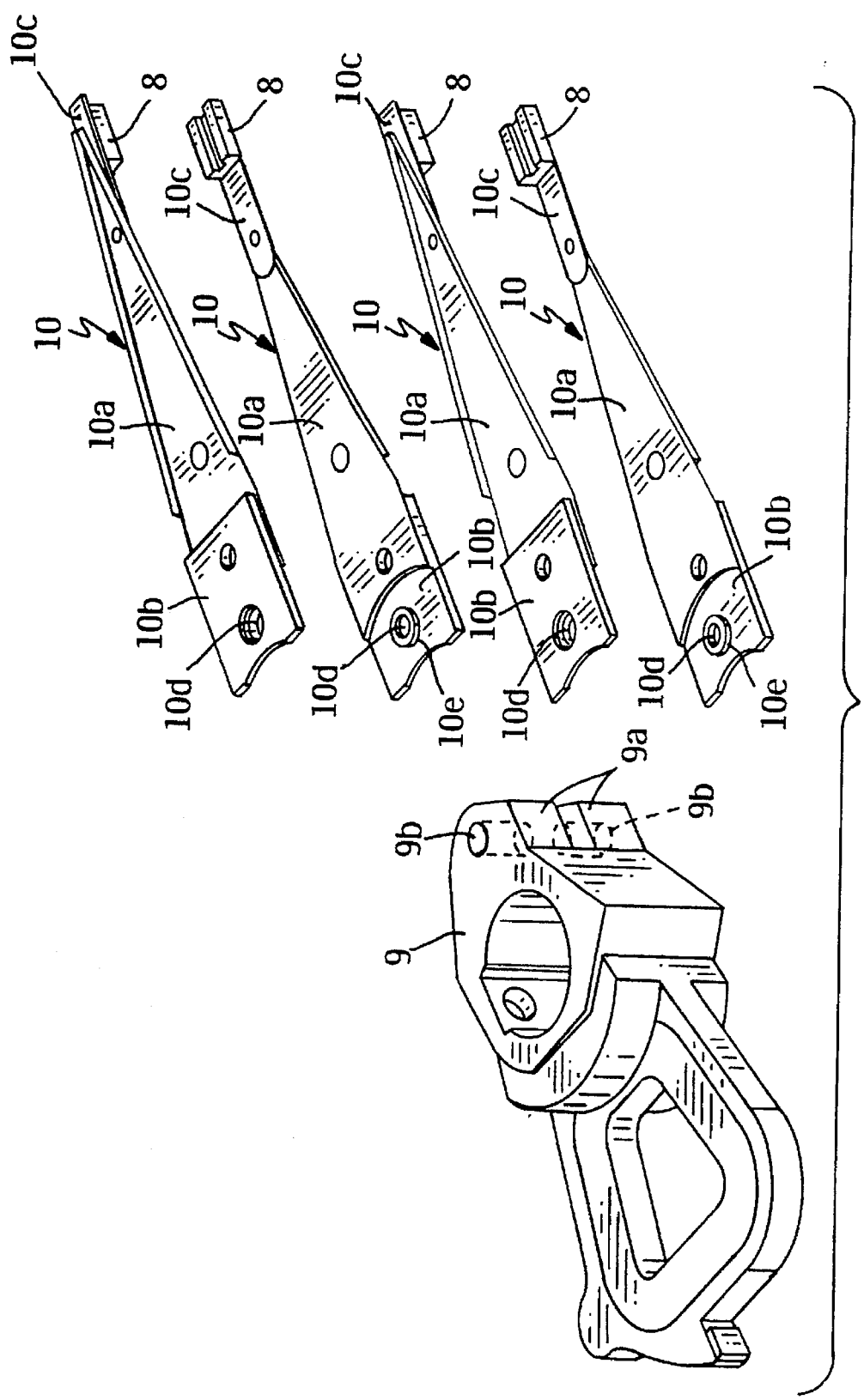
FIG. 4 is an exploded perspective view of a suspension-actuator assembly of the first preferred embodiment.

With reference to FIGS. 2 to 4, the suspension-actuator assembly in accordance with the first embodiment is illustrated in detail. The head suspension 10 includes a load beam 10a of generally triangular shape and resilient in the vertical direction to allow the transducer head 8 attached to the suspension 10 to follow the topography of the disk 7, a mount plate 10b of generally rectangular shape secured (typically laser spot welding) to one end (the base of the triangular shape) of the load beam 10a for attaching to an actuator arm 9a of the rotary actuator 9 for positioning the transducer head 8 on a selected cylinder of the disks 7, and a gimbal 10c secured (typically laser spot welding) to the other end (the tip of triangular shape) of the load beam 10a for mounting the transducer head 8 which flies over a surface of the disk 7 as the disk 7 rotates. All of the load beam 10a, the mount plate 10b, and the gimbal 10c are made of stainless steel.

The mount plate 10b has a through hole 10d and a boss 10e integrally and vertically extending from the circumference of the through hole 10d at the same side as the gimbal 10c and the transducer head 8 are attached. The boss 10e is used for connecting the suspension 10 to the actuator arm 9a of the rotary actuator 9 by a well known technique referred to as swaging or ball staking illustrated in FIG. 5. The actuator 9 is made of aluminum and has two actuator arms 9a integrally extending from the actuator 9. The upper and lower arms 9a have concentric through holes 9b of which inner diameter is slightly larger, for example, by some 10 microns, than the outer diameter of the boss 10e of the mount plate 10b.

Figure 5:
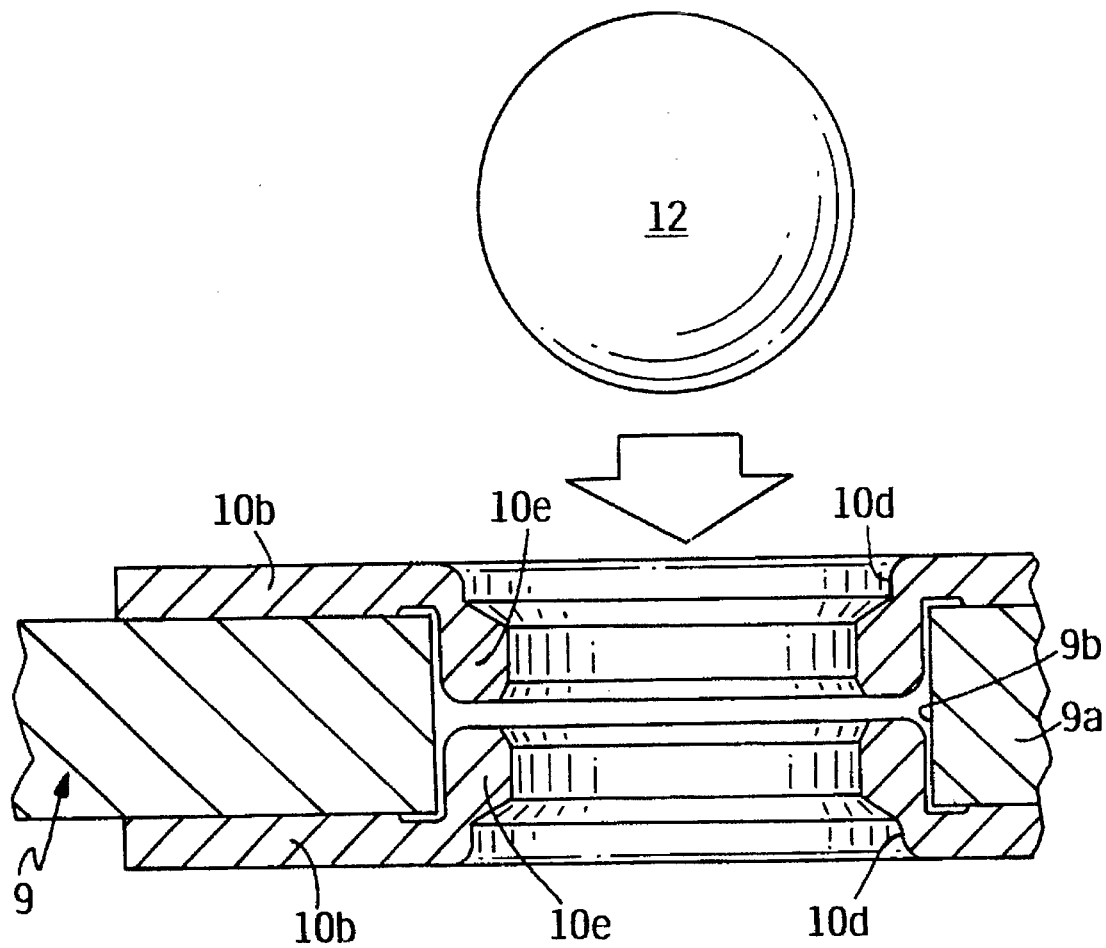
FIG. 5 is a partial cross-sectional view of the head suspension-actuator assembly of the first preferred embodiment that illustrates how to attach the head suspensions to an actuator arm.

As shown in FIG. 5 illustrating a cross-section view of one of the arm 9a and the mount plates 10b of the suspensions 10, the mount plates 10b of the suspensions 10 are secured to the arms 9a of the rotary actuator 9 at both upper and lower opening ends of the through holes 9b of the arms 9a by the ball-staking technique. The boss 10e of the mount plate 10b is inserted into the through hole 9b of the arm 9a from both upper and lower openings of the through hole 9b and then a steel ball 12 of which diameter is slightly larger than inner diameter of the boss 10e is inserted into and passes through the holes 10d of the mount plate 10b and the hole 9b of the actuator arm 9a. The boss 10e of the mount plate 10b is expanded and attached to the inner surface of the through hole 9b of the arm 9a as the ball 12 passes through the holes 9b and 10d.

Figure 6:
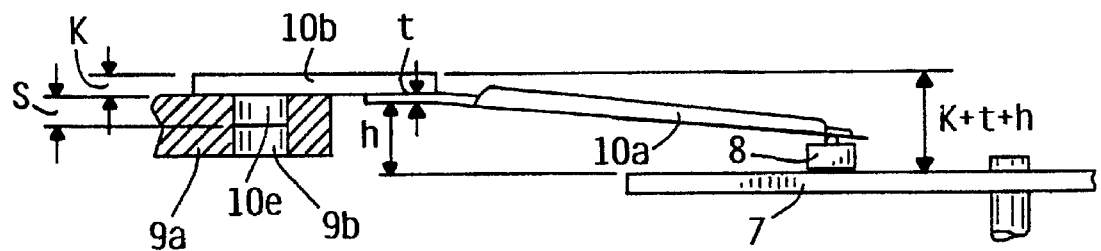
FIG. 6 is a side view of the suspension-actuator assembly in accordance with the first embodiment that illustrates the advantages of the suspension-actuator assembly in accordance with the first embodiment.
Figure 7:
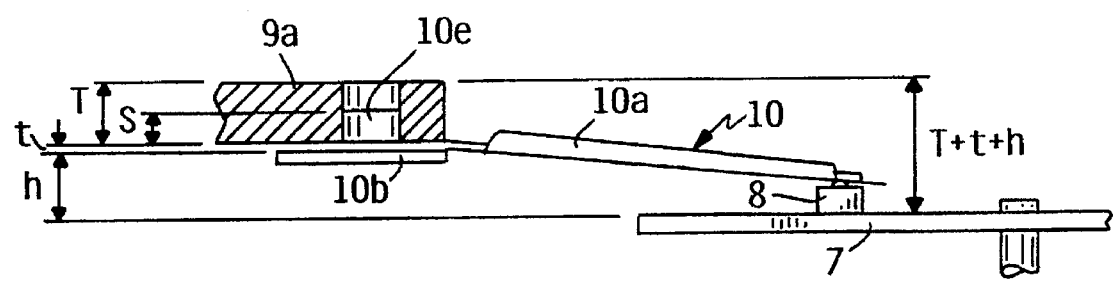
FIG. 7 is a side view of the prior art suspension-actuator assembly that illustrates the height of the prior art connection structure in comparison with the first embodiment.

FIG. 6 illustrates the advantages of the suspension-actuator assembly in accordance with the first embodiment in comparison with prior art assembly as shown in FIG. 7. Although FIGS. 6 and 7 show a disk and a head suspension for illustration purpose, it is easy to apply structures of FIGS. 6 and 7 to assemblies including more than one head suspension and more than one disk. In FIGS. 6 and 7, h is the distance between the surface of the disk 7 over which the transducer head 8 attached to the suspension 10 at one end flies as the disk 7 rotates and one end of the load beam 10a of the suspension 10 attached to the mount plate 10b. t is the thickness of the load beam 10a. K is the thickness of the mount plate 10b. T is the thickness of the actuator arm 9a. S is the height of the boss 10e extending from the surface of the mount plate 10b. In the suspension-actuator assembly shown in FIG. 6, the highest or lowest point is the mount plate 10b, which is away from the disk surface by a distance, K+t+h. In the prior art assembly in FIG. 7 the highest or lowest point is the actuator arm 9a, which is away from the disk surface by a distance, T+t+h. The thickness K of the mount plate 10b which is typically made of stainless steel can be much thinner than the thickness T of the actuator arm 9a which is typically made of aluminum because components made of stainless steel thickness have more structural rigidity than components made of aluminum. Consequently, for a disk drive apparatus of which housing contains one disk, the first embodiment of the present invention can reduce the height of the suspension-actuator assembly, that is, the height of the housing, by 2(T−K), in comparison with the prior art suspension-actuator assembly shown in FIG. 7. Moreover, it is easily understood that the suspension-actuator assembly in accordance with the first embodiment needs only one actuator arm 9a to mount two head suspensions 10 for both upper and lower surfaces of a disk because the head suspensions 10 can be attached to the actuator arm 9a at both upper and lower openings of the through hole 9b of the actuator arm 9a. But, the prior art suspension-actuator assembly shown in FIG. 7 needs two actuator arm 9a to mount two head suspensions 10 for both upper and lower surfaces of a disk. For a disk drive containing two disks, the suspension-actuator assembly in accordance with the first embodiment of the present invention can reduce the height of the suspension-actuator assembly, that is, housing, by 3T−4K−S in comparison with the prior art suspension-actuator assembly shown in FIG. 7 because the assembly of the first embodiment needs a distance of 2(K+t+h)+S for two head suspensions for the disk surfaces facing each other while the prior art assembly shown in FIG. 7 needs a distance of T+2(t+h) for two head suspensions for the disk surfaces facing each other. Moreover, it is easily understood that the assembly in accordance with the first embodiment needs two actuator arms 9a for two disks while the prior art assembly needs three actuator arms for two disks. Therefore, the structure of the first embodiment is simpler that that of the prior art. The dimensions shown in FIGS. 6 and 7 are, for instance, S=0.5 mm, t=0.076 mm, K=0.5 mm, and h=1.044 mm. In typical prior art, T is more than 1 mm. Accordingly, a disk drive with one disk in accordance with the first embodiment can reduce the height of the housing at least by 1 mm and the height of the housing with two disks at least by 0.5 mm in comparison with the prior art. Furthermore, the present invention can reduce the number of actuator arms for mounting the required number of head suspensions. The present invention can increase the thickness of the actuator arms while reducing the overall height of the suspension-actuator assembly because the head suspensions for both upper and lower surfaces of a disk can be attached to an actuator arm located between the suspensions. Therefore, for instance, the thickness of an actuator arm in accordance with the first preferred embodiment is 3.13 mm which is much thicker than the prior art actuator arm (1 mm), ensuring enough structural rigidity of an actuator arm required by the design specification of a high speed actuator while reducing overall height of the housing of the drive.

Figure 8:
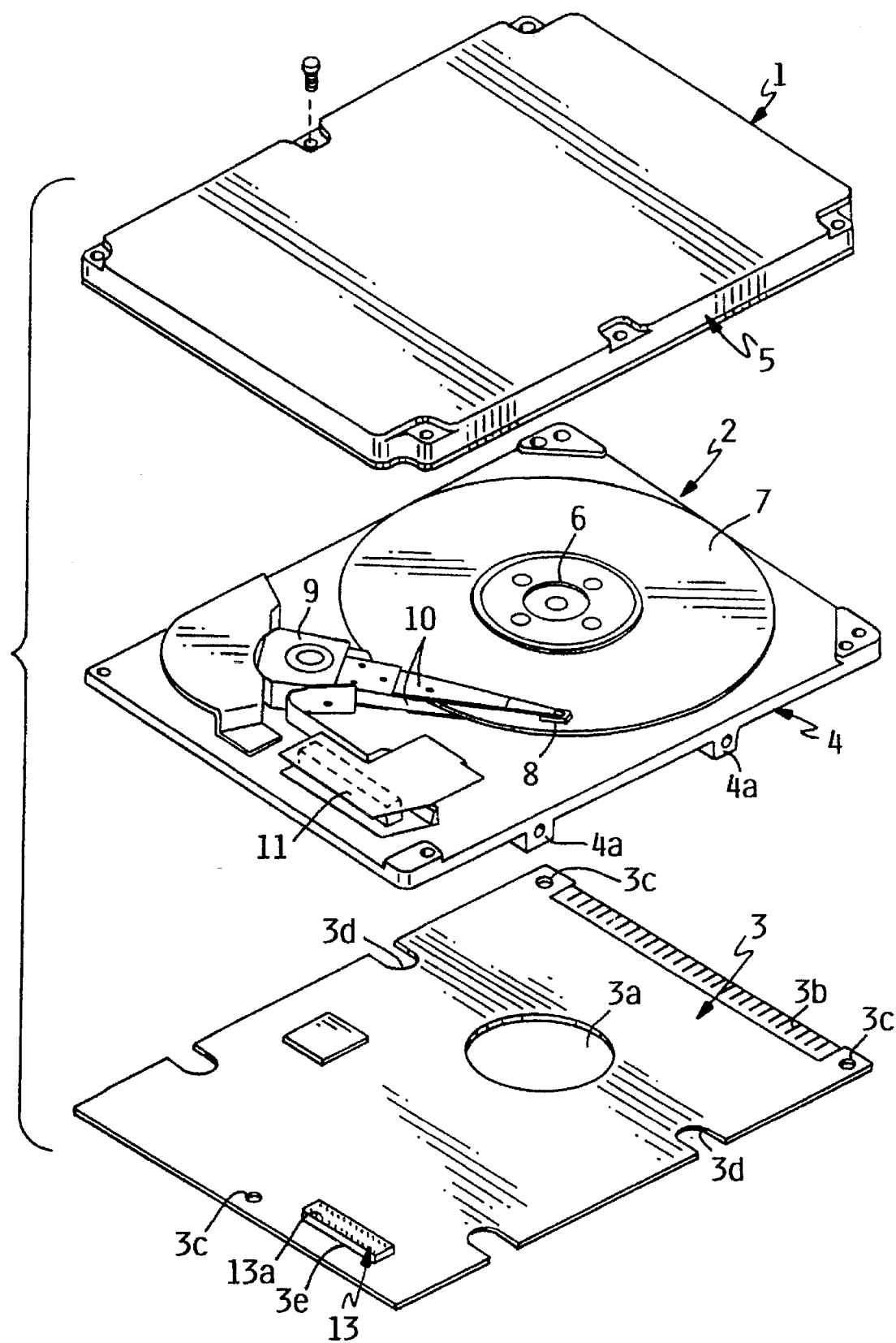
FIG. 8 is an exploded perspective view of a disk drive apparatus in accordance with a second preferred embodiment of the present invention.

With reference to FIGS. 8 to 14, a second embodiment of the present invention is illustrated. The same reference numbers as the first embodiment are used to represent similar or same members in the second embodiment. With reference to FIG. 8, a housing 2 contains a flexible printed circuit 11 attached to a base plate 4 of the housing 2 for establishing circuitry for the components, for example, transducer heads 8 and actuator 9, contained within the housing 2. A cable (not shown) from the transducer heads 8 is connected to the flexible printed circuit 11 by way of head suspensions 10 so that signals to and from the heads 8 are conveyed between the heads 8 and the flexible printed circuit 11.

Figure 9:
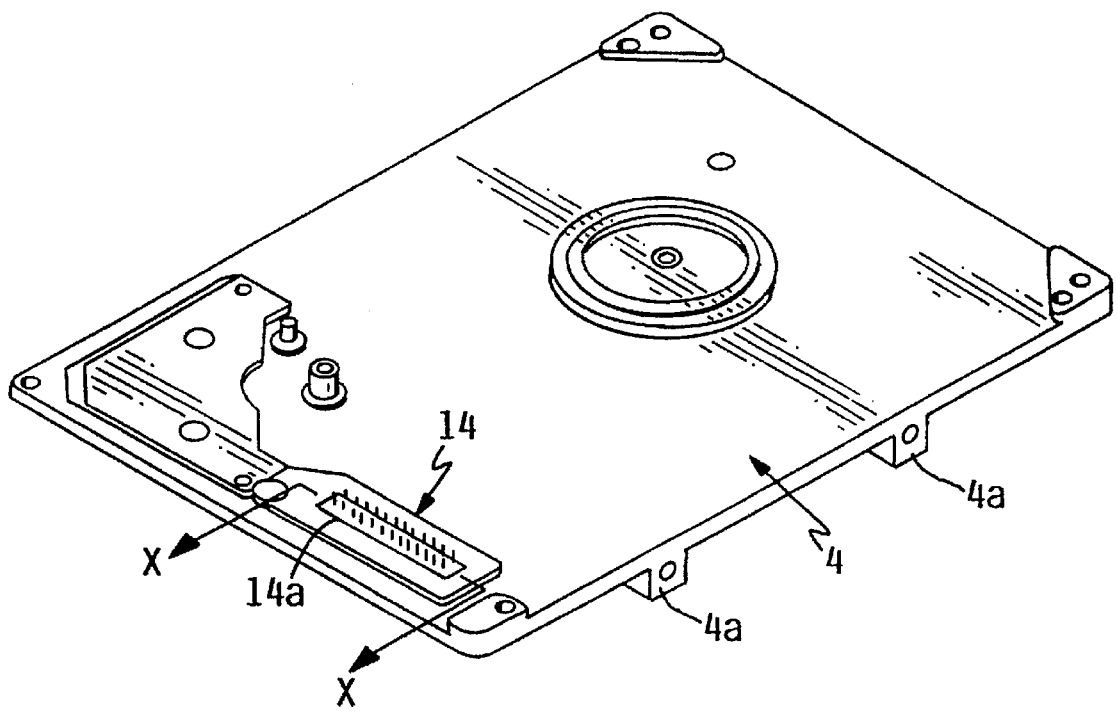
FIG. 9 is a perspective view of a base plate of the disk drive apparatus in accordance with the second embodiment of the present invention.
Figure 10:
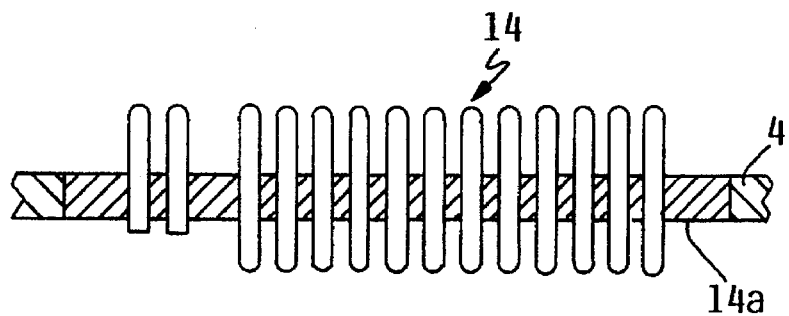
FIG. 10 is a cross-sectional view of along line X—X in FIG. 9.

As shown in FIGS. 9 and 10, the base plate 4 has a number of pins 14 passing through dielectric material 14a embedded in the base plate 4. The pins 14 are secured to the base plate 4 and extending from both inner and outer surfaces of the base plate 4 for transferring signals and power between a printed circuit board 3 attached to the outside of the housing 2 and the components contained in the controlled environment in the housing 2. The base plate 4 shown in FIG. 9 has an inner surface which is relatively smooth for illustrative purposes. But, the base plate 4 actually has various recesses and protrusions for accommodating various heights of the components. The base plate 4 has feet 4a for mounting the disk drive 1 on a computer system (not shown).

Figure 11:
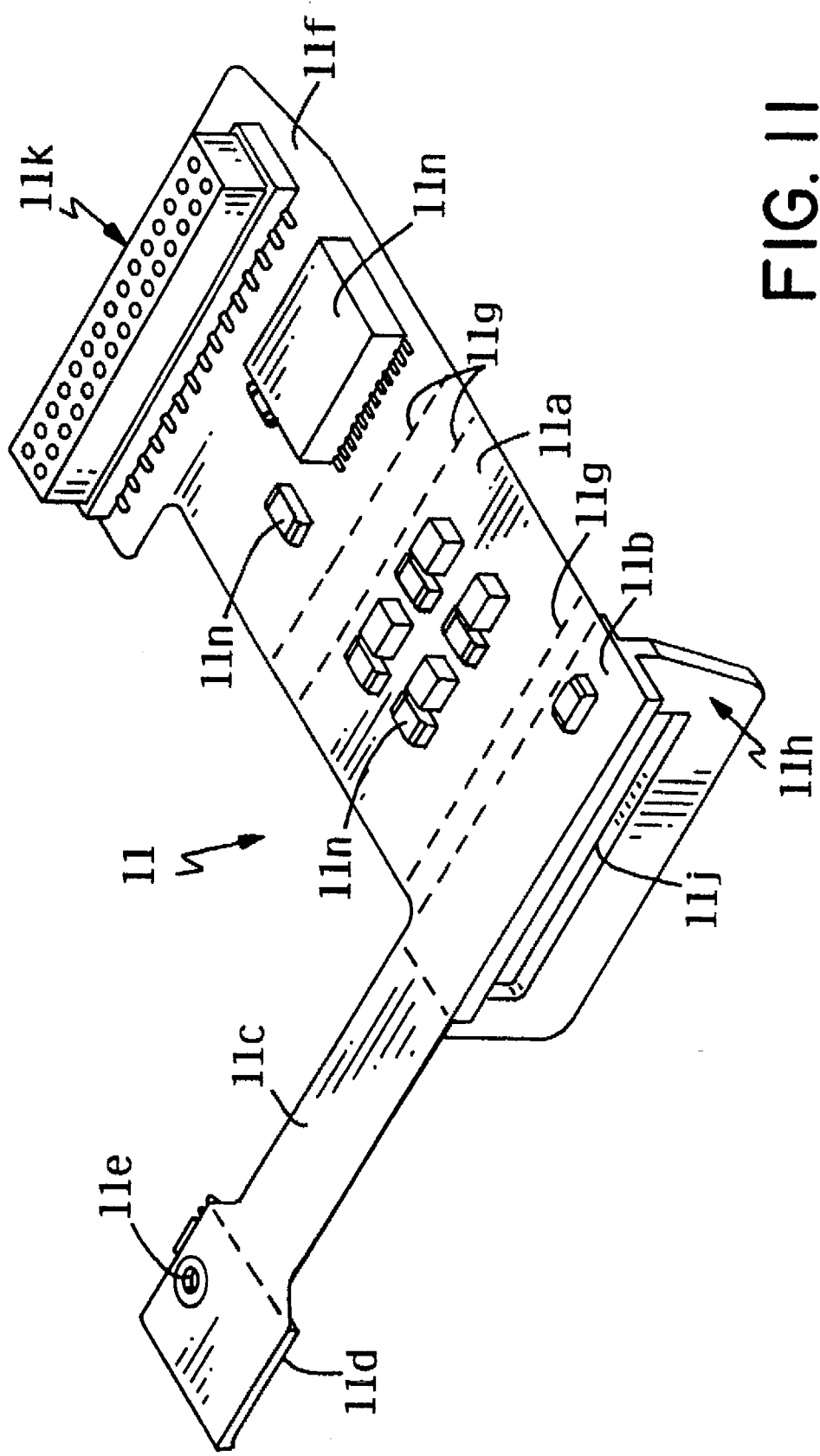
FIG. 11 is a perspective view of a flexible printed circuit in accordance with the second embodiment of the present invention that illustrates the flexible printed circuit in an extended condition.

FIG. 11 shows the details of the flexible printed circuit 11 in accordance with the second embodiment. The flexible printed circuit 11 has, at one end 11f on one surface 11a, a connector 11k into which the pins 14 are plugged for electric connection between the circuitry on the flexible printed circuit 11 and the pins 14 and, at the other end 11b on the other surface of the flexible printed circuit 11, a fixing member 11h having generally T-shaped cross section and having an opening 11j in its leg through which the pins 14 pass for positioning the flexible printed circuit 11 in horizontal directions on the base plate 4. Electronic modules 11n are mounted on the surface 11a of the flexible printed circuit 11 to establish the circuitry. The flexible printed circuit 11 has an extended portion 11c at the other end 11b. There are provided lines (not shown) on the extended portion 11c for transferring signals and power between the components, the transducer heads 8 and the actuator 9, in the housing 2 and the circuitry established on the flexible printed circuit 11. The free end of the extended portion 11c has a plate 11d having a screw hole 11e for attaching to the actuator 9. The free end of the flexible printed circuit 11 is connected to lines (not shown) from the transducer heads 8 and the actuator 9. The flexible printed circuit 11 is able to be bent about lines 11g.

Figure 12:
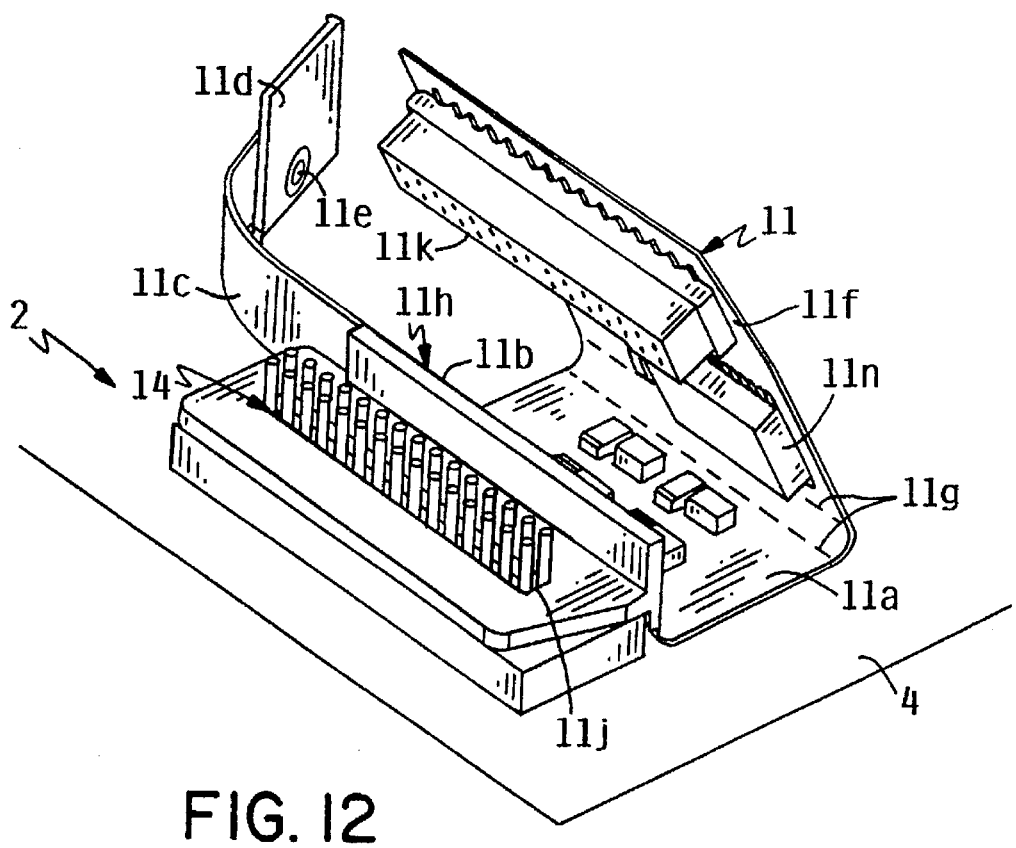
FIG. 12 is a perspective view of the flexible printed circuit of the second embodiment that illustrates how to attach and connect the flexible printed circuit to a base plate and pins of the disk drive apparatus.
Figure 13:
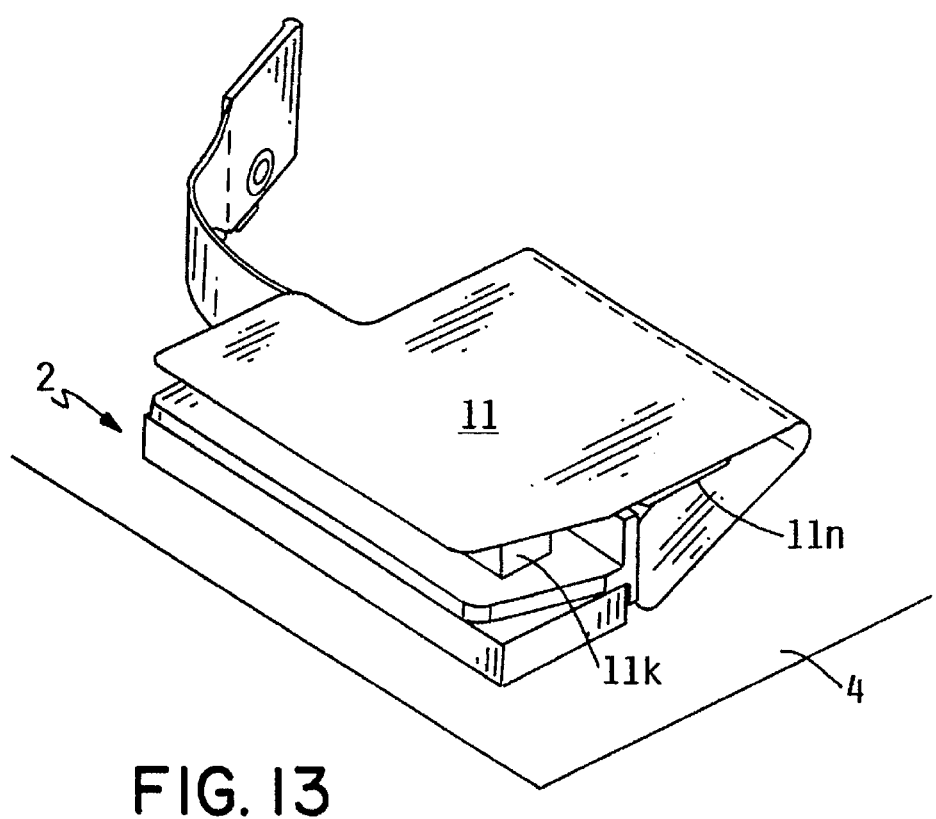
FIG. 13 is a perspective view of the flexible printed circuit of the second embodiment that illustrates the condition of the flexible printed circuit when the flexible printed circuit is attached to the disk drive apparatus.
Figure 14:
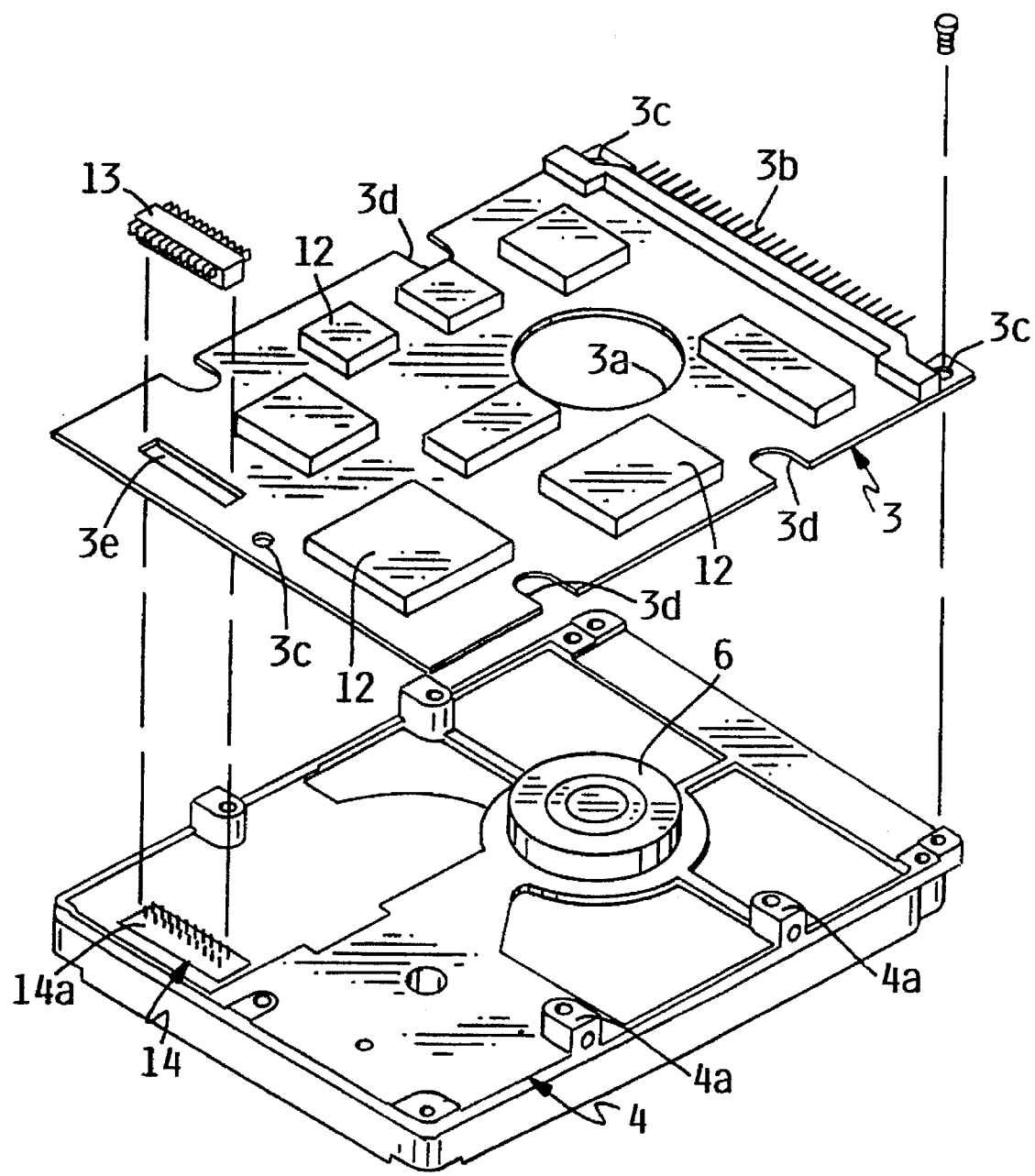
FIG. 14 is an exploded perspective view of a printed circuit board and a base plate of a disk drive apparatus in accordance with a third embodiment of the present invention.
Figure 15:
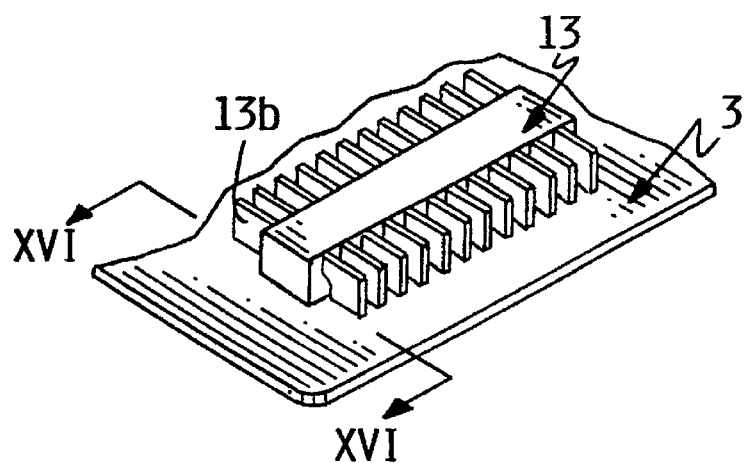
FIG. 15 is a partial perspective view of the bottom of the base plate of the disk drive apparatus of the third embodiment.

FIGS. 12 and 13 illustrate how to connect the flexible printed circuit 11 to the pins 14 extending from the base plate 4 in the housing 2. At first, the pins 14 are inserted into the opening 11j of the fixing member 11h to positioning the flexible printed circuit 11 in horizontal directions on the base plate 4. Then, the flexible printed circuit 11 is bent about the lines 11g and the pins extending from the opening 11j are plugged into the connector 11k. Then, the flexible printed circuit 11 is electrically connected to the pins 14 and secured to the base plate 4 in a folded condition as shown in FIG. 13. Neither screw nor screw hole on the base plane 4 is necessary to attach the flexible printed circuit 11 to the base plate 4. The flexible printed circuit 11 in accordance with the second embodiment improves not only the controlled environment in the housing since there is no screw hole on the base plate 4 liable to introduce contaminant into the housing 2, but also improves the efficiency of assembling the disk drive 1 since there is no use of a screw for attaching the flexible printed circuit 11 to the base plate 4. Moreover, the folded flexible printed circuit 11 of the second embodiment can save space for the flexible printed circuit 11 in the housing 2 because the folded flexible printed circuit 11 reduces its foot print. This is important to attain a disk drive of small size because the reduced foot print of the flexible printed circuit 11 is able to find room for the flexible printed circuit 11 in the housing 2 free from interference with the rotating disks 7 and the rotating actuator 9.

With reference to FIGS. 14 to 17, a third embodiment of the present invention is illustrated. The same reference numbers as the first embodiment are used to represent similar or same members in the third embodiment. A printed circuit board 3 for establishing circuitry to control components, such as, transducer heads, an actuator, and a spin motor, contained within a housing 2 is attached to the bottom of a base plate 4 of the housing 2 in stacked relationship. The printed circuit board 3 has a connector 13 for providing an interface between the circuitry established on the printed circuit board 3 and the components contained in the housing 2, and a through hole 3e for providing the connector 13 therein. The pins 14 extending from the bottom of the base plate 4 are plugged into connection holes 13a (See FIG. 8) of the connector 13 facing the pins 14. The connector 13 has terminals 13b extending on a surface of the printed circuit board 3 facing away from the base plate 3 for connecting the pins 14 to the circuitry on the printed circuit board 3. The bottom of the base plate 4 has various heights of protrusion due to the various heights of the components contained within the housing 2. Accordingly, most of electronic components 12 are mounted on the surface of the printed circuit board facing away from the base plate 4 (See FIGS. 8 and 14). The printed circuit board 3 is attached to the bottom of the base plate 4 by screws passing through screw holes 3c formed in the printed circuit board as close as possible to reduce the overall height Q (See FIG. 17) of the disk drive 1. A thin sheet of dielectric material (not shown) is interposed between the bottom of the base plate 4 and the printed circuit board 3 to avoid short-circuiting between them. The printed circuit board 3 has an opening 3a for accommodating a spin motor 6 protruding from the base plate 4, several openings 3d for accommodating feet 4a of the base plate 4 for attaching the drive 1 to a computer system (not shown), and a connector 3b at one end for connecting to the computer system (not shown).

Figure 16:
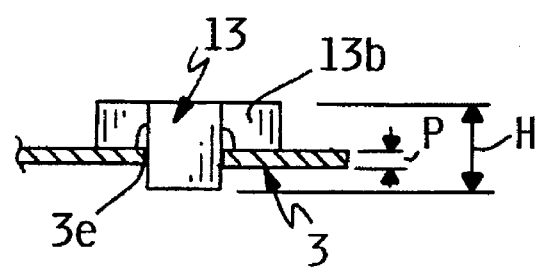
FIG. 16 is a cross-sectional view along line XVI—XVI in FIG. 15.
Figure 17:
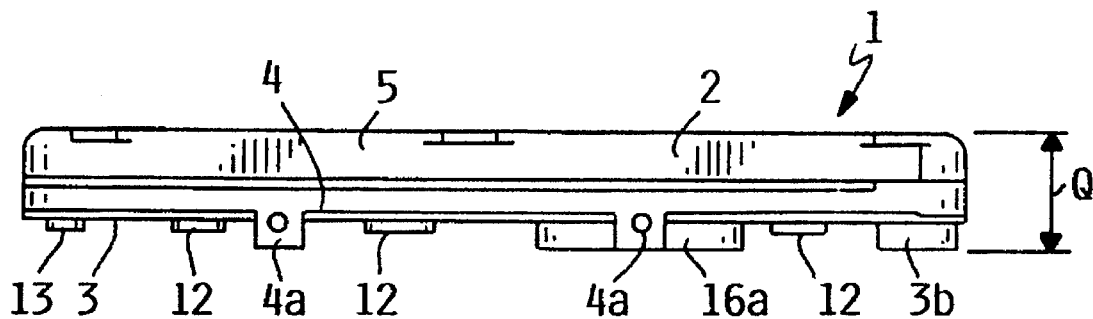
FIG. 17 is a side view of the disk drive apparatus of the third preferred embodiment of the present invention.
Figure 18:
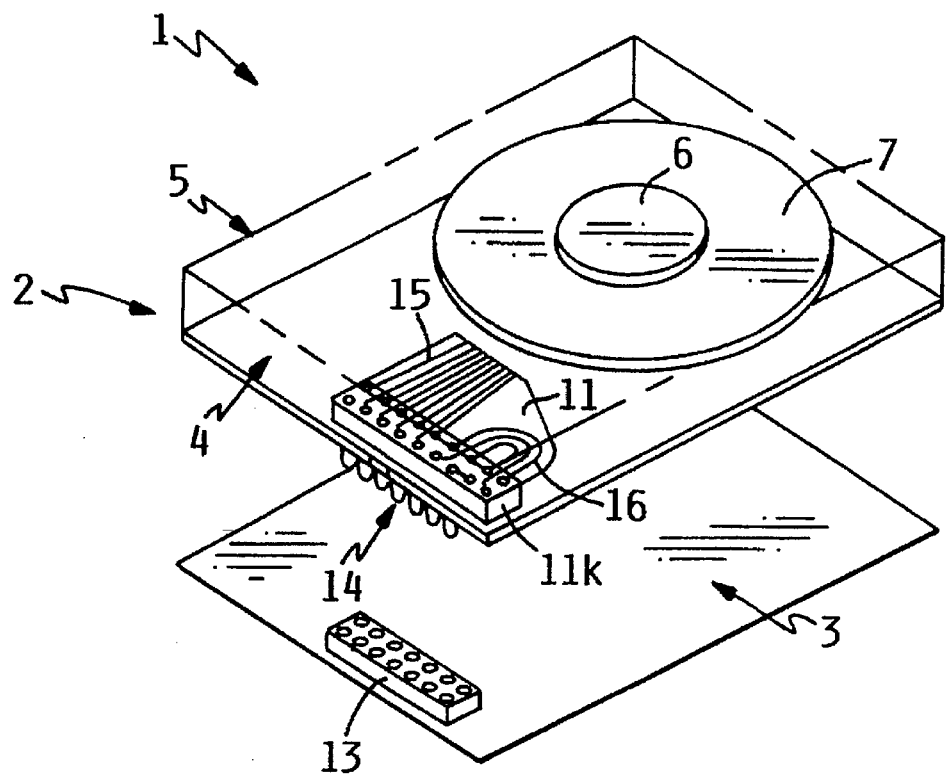
FIG. 18 is a schematic exploded perspective view of a disk drive apparatus in accordance with a fourth embodiment of the present invention.
Figure 19:
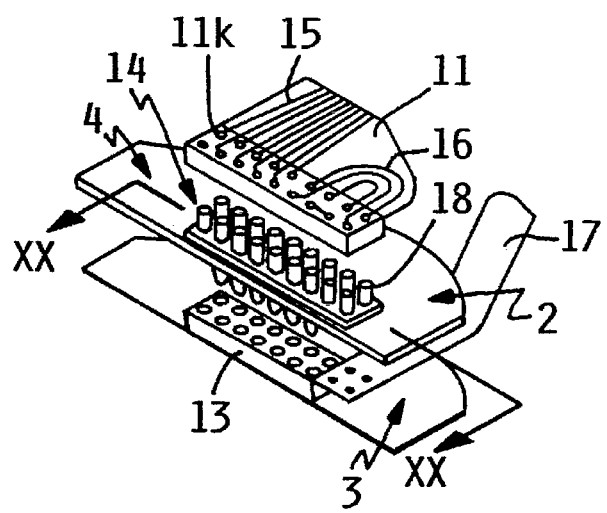
FIG. 19 is a partial exploded perspective view of the essential part of the disk drive apparatus in accordance with the fourth embodiment.
Figure 20:
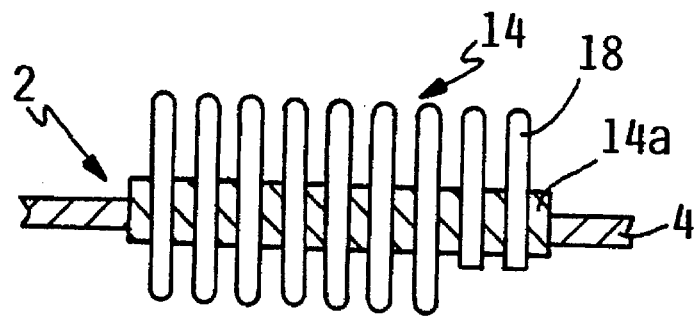
FIG. 20 is a cross-sectional view along line XX—XX in FIG. 19.
Figure 21:
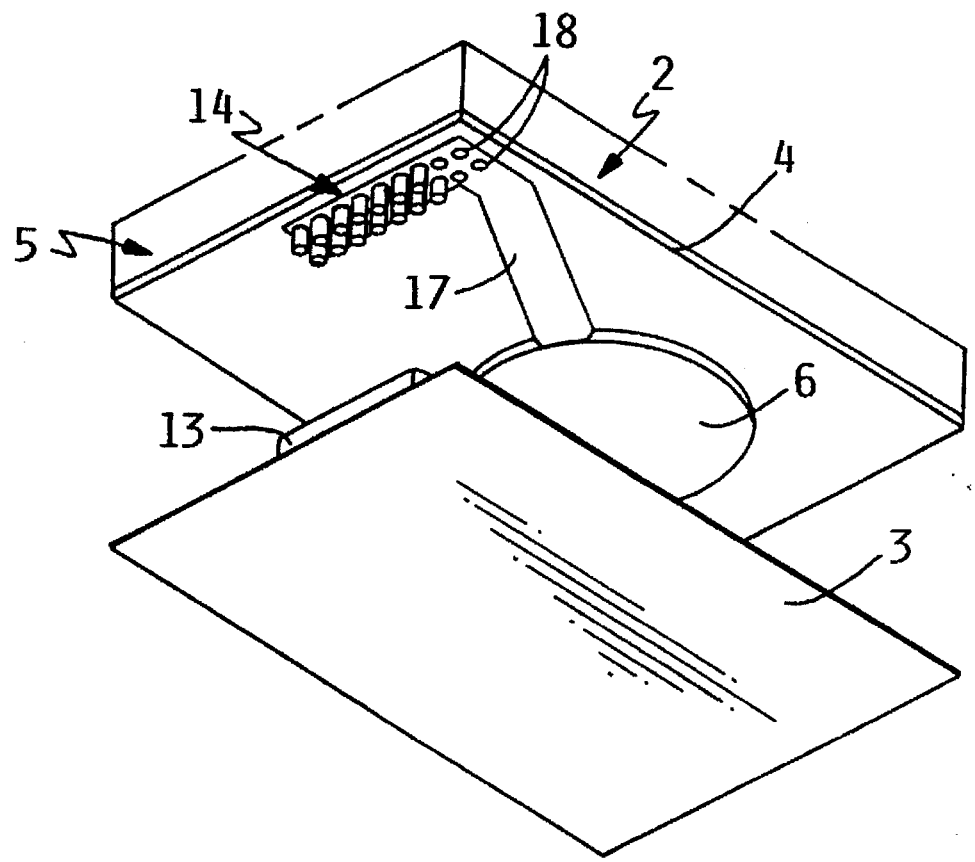
FIG. 21 is an exploded perspective view of the bottom of the printed circuit board and the housing of the disk drive apparatus in accordance with the fourth embodiment.

As shown in FIG. 16, the effective height of the connector 13 having a thickness of H is reduced by a thickness p of the printed circuit board 4. Consequently, The overall height Q (see FIG. 17) of the disk drive 1 in accordance with the third embodiment can be reduced by p in comparison with prior art disk drive. The thickness p of the printed circuit board 3, for instance, is 0.7 mm in the third embodiment of the present invention.

With reference to FIGS. 18 to 21, a fourth embodiment of the present invention is illustrated. The same reference numbers as the first embodiment are used to represent similar or same members in the fourth embodiment. A disk drive 1 has a housing 2 for containing components, such as, a disk 7, a spin motor 6, a transducer head (not shown), an actuator (not shown) in a controlled environment within the housing 2. The housing 2 contains a flexible printed circuit 11 on which circuitry 15 for the components, such as, transducer heads (not shown) and actuator (not shown), contained in the housing 2 is provided. The circuitry 15 is connected to a printed circuit board 3 attached to the bottom of the housing 2 for controlling the components in the housing 2 by way of a connector 11k attached to the flexible printed circuit 11, a number of pins 14 passing through dielectric material 14a embedded in a base plate 4 of the housing 2, and a connector 13 provided on the printed circuit board 3 for providing an interface between circuitry established on the printed circuit board 3 and the components contained in the housing 2. A spin cable 17 including four lines (not shown) for supplying the spin motor 6 with power and signals between the spin motor 6 and the printed circuit board 3 is attached to the bottom of the base plate 4 by adhesive. One end of the spin cable 17 is attached to the spin motor 6 at the bottom of the base plate 4. The other end of the spin cable 17 is connected to four pins 18 passing through the dielectric material 14a embedded in the base plate 4 at the bottom of the base plate 4. The pins 18 are, in turn, connected to the connector 11k attached to the flexible printed circuit 11 in the housing 2. There are four lines 16 for connecting the pins 18 to four of the pins 14 one another on the flexible printed circuit 11. Consequently, the spin cable 17 is connected to the connector 13 on the printed circuit board 3 by way of the pins 18, the connector 11k, the lines 16 on the flexible printed circuit 11, the connector 11k and the pins 14. The printed circuit board 3 supplies the spin motor 6 with power and signals through the spin cable 17.

Providing a spin cable outside the housing not only results in a low profile housing of a disk drive apparatus by avoiding interference between rotating disks or the rotating actuator arms provided in a low profile housing and the spin cable but also prevents the disk from erosion or contamination by the adhesive used to attach the spin cable to the housing. The connection between the spin motor and the printed circuit board is accomplished by the connection between the pins of the housing and the connector on the printed circuit board. Therefore, the connector is only one interface between the components in the housing and the electronics on the printed circuit board. This only one interface facilitates assembling of the disk drive housing and the printed circuit board.

In accordance with the present invention, a disk drive apparatus with one hard disk having an overall height of 12.7 mm is attained. A disk drive apparatus with two hard disks having an overall height of 17.0 mm is attained by the present invention.

The foregoing description of the invention has been presented for purposes of illustration and description. Further, the description is not intended to limit the invention to the form disclosed therein. Consequently, variations and modifications commensurate with the above teachings, and the skill or knowledge in the relevant art are within the scope of the present invention.

What is claimed is:

1. A disk drive apparatus, comprising:

at least one hard disk having an upper surface and a lower surface;

a spin motor for rotating said hard disk;

a first transducer head for communicating information with said upper surface of said disk and a second transducer head for communicating information with said lower surface of said disk;

an actuator including at least one actuator arm in which an actuator arm through hole is provided;

a first rigid mount plate and a second rigid mount plate each including a planar surface having a first end and a second end, said actuator arm is attached to said planar surface of each of said mount plates at each said first end, and each said second end extends away from said actuator arm;

a first load beam attached to said planar surface of said first mount plate at said second end thereof on a face of said first mount plate facing towards said disk, said first transducer head mounted away from said first mount plate on a face of said first load beam facing towards said disk, said first load beam being resilient in a vertical direction to allow said first transducer head to follow the topography on said upper surface of said hard disk, and at said first end of said first mount plate, a first mount plate through hole and a first mount plate boss protruding from the circumference of said first mount plate through hole on said face of said first mount plate facing towards said disk are provided, said first mount plate boss being attached to said actuator arm at one end of said actuator arm through hole; and a second load beam attached to said planar surface of said second mount plate at said second end thereof on a face of said second mount plate facing towards said disk, said second transducer head mounted away from said second mount plate on a face of said second load beam facing towards said disk, said second load beam being resilient in a vertical direction to allow said second transducer head to follow the topography on said lower surface of said hard disk, and at said first end of said second mount plate, a second mount plate through hole and a second mount plate boss protruding from the circumference of said second mount plate through hole on said face of said second mount plate facing towards said disk are provided, said second mount plate boss being attached to said actuator arm at the other end of said actuator arm through hole.

2. A hard disk drive apparatus, comprising:

N hard disks, where N is greater than or equal to one, each of said hard disks having an upper surface and a lower surface;

a spin motor for rotating said N hard disks;

N first transducer heads for communicating information with said upper surface of each of said N disks and N second transducer heads for communicating information with said lower surface of each of said N disks;

an actuator including N actuator arms, each of said N actuator arms for each respective one of said N hard disks, and each of said N actuator arms having an actuator arm through hole;

N first and N second mount plates, each of said mount plates being rigid and including a planar surface having a first end and a second end, wherein each of said N actuator arms is attached to said planar surface of each of said first mount plates and each of said second mount plates at each said first end, and each said second end extends away from said N actuator arms;

N first lead beams each attached to said planar surface of each of said first mount plates at said second end thereof on a face of each of said N first mount plates facing towards each respective one of said N disks, each of said N first transducer heads mounted away from each of said N first mount plates on a face of each of said N first lead beams facing towards each respective one of said disks, each first load beam being resilient in a vertical direction to allow each first transducer head to follow the topography on said upper surface of each respective disk, and at said first end of each of said N first mount plates, a first mount plate through hole and a first mount plate boss protruding from the circumference of said first mount plate through hole on said face of each of said N first mount plates facing towards each respective one of said N disks are provided, each first mount plate boss being attached to each respective one of said N actuator arms at one end of said actuator arm through hole thereof; and N second lead beams each attached to said planar surface of each of said N second mount plates at said second end thereof on a face of each of said N second mount plates facing towards each respective one of said N disks, each of said N second transducer heads mounted away from each of said N second mount plates on a face of each of said N second load beams facing towards each respective one of said N disks, each second load beam being resilient in a vertical direction to allow each second transducer head to follow the topography on said lower surface of each respective disk, and at said first end of each of said N second mount plates, a second mount plate through hole and a second mount plate boss protruding from the circumference of said second mount plate through hole on said face of each of said N second mount plates facing towards each respective one of said N disks are provided, each second mount plate boss being attached to each respective one of said N actuator arms at the other end of said actuator arm through hole thereof.

* * * * *

UNITED STATES PATENT AND TRADEMARK OFFICE
CERTIFICATE OF CORRECTION

PATENT NO. : 5,646,802

DATED : July 8, 1997

INVENTOR(S) : Hiroyuki Akiyama et al

It is certified that error appears in the above-identified patent and that said Letters Patent is hereby corrected as shown below:

Column 12, line 47, "lead" should be --load-- and
Column 13, line 1, "lead" should be --load--.

Signed and Sealed this

Twenty-fifth Day of November, 1997

*Attest:*

BRUCE LEHMAN

*Attesting Officer*  Commissioner of Patents and Trademarks